3,382,256
N,N'-ALKYLENEBIS(AZIDOACETAMIDES)
Philip M. Carabateas, Schodack, N.Y., assignor to Sterling Drug Inc., New York, N.Y., a corporation of Delaware
No Drawing. Filed Aug. 15, 1966, Ser. No. 572,220
3 Claims. (Cl. 260—349)

ABSTRACT OF THE DISCLOSURE

N,N'-alkylenebis(azidoacetamides) where alkylene has two to ten carbon atoms, having antitrichomonal activity, are prepared by reacting corresponding alkylenediamines with two molar equivalents of a lower-alkyl azidoacetate.

This invention relates to compositions of matter known in the art of chemistry as N,N'-bis(acyl)alkylenediamines and to a process for preparing such compositions.

The invention sought to be patented, in its composition aspect, resides in the class of compounds which I designate N,N'-alkylenebis(azidoacetamides) or, alternatively, as N,N'-bis(azidoacetyl)alkylenediamines. Accordingly, I depict these compounds as having a molecular configuration in which azidoacetyl is attached to each nitrogen atom of an alkylenediamine where alkylene has from two to ten carbon atoms inclusive and has its connecting linkages on different carbon atoms.

The invention sought to be patented, in its process aspect, is described as residing in the process of reacting an alkylenediamine with two molar equivalents of a lower-alkyl azidoacetate to prepare said N,N'-alkylenebis(azidoacetamides).

The tangible embodiments of the composition aspect of the invention possess the inherent general physical properties of being colorless crystalline solids, substantially insoluble in water and of varying solubility in organic solvents. Examination of the compounds of the invention reveals, upon infrared spectrographic analysis, data confirming the molecular structures assigned to the compounds. These data, taken together with the nature of the starting materials, modes of synthesis and results of elementary analysis, positively confirm the structures of the compositions sought to be patented.

The tangible embodiments of the composition aspect of the invention possess the inherent applied use characteristics of exerting an antitrichomonal effect in animal organisms, as determined by standard chemotherapeutic evaluation procedures in mice.

Without limiting the generality of the foregoing, illustrative and preferred embodiments of said N,N'-alkylenebis(azidoacetamides) are those of Formula I $$N_3CH_2CONH—Y—NHCOCH_2N_3$$

(I)

where Y is alkylene as defined an illustrated hereinbelow.

The term "alkylene," as used throughout this specification, e.g., as represented by Y in Formula I, means an alkylene radical having from two to ten carbon atoms inclusive and having its two connecting linkages on different carbon atoms, including, for purposes of illustration but without limiting the generality of the foregoing, —CH$_2$CH$_2$—, —CH$_2$CHCH$_3$, —CH(CH$_3$)CHCH$_3$,
—CH(C$_2$H$_5$)CH$_2$—, —CH$_2$CH$_2$CH$_2$—,

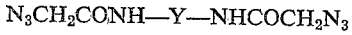

—(CH$_2$)$_4$—, —(CH$_2$)$_5$—, —(CH$_2$)$_6$—,

—CH$_2$CH$_2$CH(CH$_3$)CH$_2$CH$_2$CH$_2$—

—(CH$_2$)$_7$—, —(CH$_2$)$_8$—, —(CH$_2$)$_9$—, —(CH$_2$)$_{10}$—, and the like.

The term "lower-alkyl," as used throughout this specification, means an alkyl radical having from one to six carbon atoms, inclusive, illustrated by methyl, ethyl, isopropyl, n-propyl, n-butyl, 2-butyl, isobutyl, n-amyl, n-hexyl, and the like.

The manner and process of making and using the invention will now be generally described so as to enable a person skilled in the art of chemistry to make and use the same, as follows:

N,N'-alkylenebis(azidoacetamides) are prepared by reacting an alkylenediamine with at least two molar equivalents of a lower-alkyl azidoacetate. The reaction is carried out preferably by mixing one molar equivalent of the alkylenediamine with about two and one-half molar equivalents of the lower-alkyl azidoacetate, warming the reaction mixture to form a clear solution, and allowing the solution to stand at room temperature until completion of the reaction. In practice, the reaction mixture was allowed to stand for several days; however, the reaction probably is completed within a few hours. Alternatively, the reaction can be run using a dry solvent inert under the conditions of the reaction, e.g., ethanol, methanol, isopropyl alcohol, dioxane, tetrahydrofuran, and the like, or it can be run by gently and cautiously warming the reaction mixture in the presence or absence of said suitable solvent.

The intermediate alkylenediamines and lower-alkyl azidoacetates used in the process are generally known compounds which are either commercially available or readily prepared by generally known procedures. For example, the lower-alkyl azidoacetates are conveniently prepared by reacting a lower-alkyl haloacetate with an alkali azide, e.g., ethyl azidoacetate by reacting ethyl chloroacetate with sodium azide.

The best mode contemplated for carrying out the invention will now be set forth, as follows:

A mixture of 32.2 g. of ethyl azidoacetate and 11.6 g. of hexamethylenediamine was warmed gently on a steam bath to obtain a clear solution, which was allowed to stand for four days. The oily reaction mixture was triturated with a glass rod to obtain a white solid. The solid was washed with a mixture of one part of ether to one part of n-pentane and was recrystallized from ethyl acetate to obtain 21.3 g. of white crystalline N,N'-hexamethylenebis(azidoacetamide), M.P. 74.2–76.4° C. (corr.).

*Analysis.*—Calcd. for C$_{10}$H$_{18}$N$_8$O$_2$: C, 42.54; H, 6.43; N, 39.71. Found: C, 42.36; H, 6.33; N, 39.44.

Following the above-described procedure, but using 32.2 g. of ethyl azidoacetate and 14.4 g. of octamethylenediamine, 25.0 g. of white crystalline N,N'-octamethylenebis(azidoacetamide), M.P. 79.4–80.4° C. (corr.), was obtained.

*Analysis.*—Calcd. for C$_{12}$H$_{22}$N$_8$O$_2$: C, 46.42; H, 7.14; N, 36.11. Found: C, 46.29; H, 7.00; N, 36.06.

The foregoing description of the invention is for purpose of illustration and does not limit the generality of the applicability of the inventive concept as herein set forth. Other N,N'-alkylenebis(azidoacetamides) can be prepared in the manner above-described by substituting molar equivalent quantities of the appropriate alkylenediamine and lower-alkyl azidoacetate, using at least two molar equivalents of the latter per mole of alkylenediamine. Further illustrative compounds thus prepared are: N,N'-1,2-ethylenebis(azidoacetamide) by reacting ethylenediamine with ethyl azidoacetate; N,N'-1,3-propylenebis(azidoacetamide) by reacting 1,3-propylenediamine with methyl azidoacetate; N,N'-1,2-propylenebis(azidoacetamide) by reacting 1,2-propylenediamine with n-propyl azidoacetate; N,N'-1,4-butylenebis(azidoacetamide) by reacting 1,4-butylenediamine with ethyl azidoacetate; N,N' - pentamethylenebis(azidoacetamide) by reacting pentamethylenediamine with n-hexyl azidoacetate; N,N'- heptamethylenebis(azidoacetamide) by reacting heptamethylenediamine with ethyl azidoacetate; N,N'-3-methyl-1,6-hexanebis(azidoacetamide) by reacting 3-methyl-1,6-hexanediamine with ethyl azidoacetate; N,N'-nonamethylenebis(azidoacetamide) by reacting nonamethylenediamine with ethyl azidoacetate; and, N,N'-decamethylenebis(azidoacetamide) by reacting decamethylenediamine with ethyl azidoacetate.

The N,N'-alkylenebis(azidoacetamides) when tested according to standard chemotherapeutic evaluation procedures in animals have been found to possess the inherent applied use characteristics of exerting an antitrichomonal effect in animal organisms. For example, when administered orally to mice in the standard chemotherapeutic test described below, these compounds were found to protect about 20 to 30% of the animals tested at a dose level of 200 mg./kg./day.

Said antitrichomonal test procedure is described as follows: Inject subcutaneously on the ventral surface Swiss mice weighing about 20 g. with 0.5 ml. of *Trichomonas vaginalis* culture. Beginning the same day divide the mice into groups of fifteen animals each and medicate orally with said N,N'-alkylenebis(azidoacetamide) or reference drug twice daily for fifteen days. Similarly, sham medicate an infection control group of fifteen mice with the vehicle, 10% autoclaved gelatin. On the eighth day sacrifice the mice and examine grossly for abscesses, and when present, examine the exudate microscopically for active trichomonas. For purpose of illustration but without limiting the generality of the foregoing, when tested in this manner at a dose level of 200 mg./kg./day, N,N'-octamethylenebis(azidoacetamide) and N,N'-hexamethylenebis(azidoacetamide) were found, respectively, to protect 30% and 22% of the animals tested.

Also, N,N'-octamethylenebis(azidoacetamide), when administered subcutaneously at a dose of 100 mg./kg./day for twelve days in a vehicle of cottonseed oil containing 10% ethyl alcohol to sexually mature male rats which received concurrently a standard dose (0.10 mg./kg./day for twelve days) of the estrogen, diethylstilbestrol dipalmitate, was found to reverse the estrogen's effect of decreasing the weights of the ventral prostrates and seminal vesicles, thus indicating anti-estrogenic activity.

The subject matter which the applicant regards as his invention is particularly pointed out and distinctly claimed as follows:

1. N,N'-alkylenebis(azidoacetamide) of the formula $$N_3CH_2CONH-Y-NHCOCH_2N_3$$

where Y is alkylene of two to ten carbon atoms inclusive and said alkylene has its two connecting linkages on different carbon atoms.

2. N,N'-octamethylenebis(azidoacetamide), according to claim 1 where alkylene is octamethylene.

3. N,N'-hexamethylenebis(azidoacetamide), according to claim 1 where alkylene is hexamethylene.

References Cited

Houben-Weyl, Meth. d. Org. Chem. (Georg Thieme, Stuttgart, 1958) Sticksoff Verbindungen II and III, p. 3.

Skinner, et al., J. of Med. Chem. 8 (5), pp. 647–650 (September 1965).

JOHN D. RANDOLPH, *Primary Examiner.*

WALTER A. MODANCE, *Examiner.*

C. M. SHURKO, *Assistant Examiner.*